United States Patent
Bhat et al.

(10) Patent No.: US 11,000,435 B2
(45) Date of Patent: *May 11, 2021

(54) MULTI-LAYERED CUSHIONING SUPPORT

(71) Applicant: PRS Medical Technologies, Inc., Menlo Park, CA (US)

(72) Inventors: Nikhil Bhat, Fremont, CA (US);
George Y. Choi, Menlo Park, CA (US);
Allen J. Li, San Francisco, CA (US);
Anuj Bhat, Maharashtra (IN)

(73) Assignee: PRS Medical Technologies, Inc., Menlo Park, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 16/103,415

(22) Filed: Aug. 14, 2018

(65) Prior Publication Data

US 2018/0369042 A1    Dec. 27, 2018

Related U.S. Application Data

(63) Continuation of application No. 15/016,045, filed on Feb. 4, 2016, now Pat. No. 10,064,772, which is a
(Continued)

(51) Int. Cl.
*A61G 7/057* (2006.01)
*A61G 5/10* (2006.01)
(Continued)

(52) U.S. Cl.
CPC ........ *A61G 7/05776* (2013.01); *A47C 27/081* (2013.01); *A47C 27/085* (2013.01);
(Continued)

(58) Field of Classification Search
CPC ............... A61G 7/05776; A61G 7/057; A61G 7/05769; A61G 7/05738; A61G 5/1043;
(Continued)

(56) References Cited

U.S. PATENT DOCUMENTS 2,434,641 A * 1/1948 Burns .................... A47C 27/18
267/117
3,008,465 A    11/1961 Gal
(Continued)

FOREIGN PATENT DOCUMENTS

CN    201492611    6/2010
CN    201978072    9/2011
(Continued)

*Primary Examiner* — David R Hare
(74) *Attorney, Agent, or Firm* — Levine Bagade Han LLP

(57) ABSTRACT

Multi-layer cushion supports are described which may generally comprise a first support having a first contact surface for contacting a portion of a body and a second surface opposite to the first surface, the first support defining a central chamber and a peripheral chamber surrounding the central chamber, wherein the first support is filled with a first gas or liquid and a second support attached to the first support along the first contact surface. The second support may be filled with a second gas or liquid which is relatively more viscous than the first gas or liquid. In particular, the first support may be filled with a volume of air and the second support may be filled with oil which is less than the volume of air.

16 Claims, 5 Drawing Sheets

Related U.S. Application Data continuation of application No. 14/191,212, filed on Feb. 26, 2014, now Pat. No. 9,320,666.

(51) Int. Cl.

| | | |
|---|---|---|
| *B32B 1/00* | (2006.01) | |
| *A47C 27/08* | (2006.01) | |
| *A47C 27/14* | (2006.01) | |
| *A47C 27/15* | (2006.01) | |
| *B32B 27/06* | (2006.01) | |
| *B32B 27/30* | (2006.01) | |

(52) U.S. Cl.
CPC ............ *A47C 27/144* (2013.01); *A47C 27/15* (2013.01); *A61G 5/1043* (2013.01); *A61G 5/1045* (2016.11); *A61G 7/057* (2013.01); *A61G 7/05769* (2013.01); *B32B 1/00* (2013.01); *B32B 27/065* (2013.01); *B32B 27/304* (2013.01); *A61G 7/05738* (2013.01); *B32B 2266/0278* (2013.01); *B32B 2535/00* (2013.01)

(58) Field of Classification Search
CPC .. A61G 5/1045; A47C 27/081; A47C 27/085; A47C 27/144; A47C 27/15; B32B 27/065; B32B 27/304; B32B 1/00; B32B 2266/0278; B32B 2535/00
See application file for complete search history.

(56) References Cited

U.S. PATENT DOCUMENTS

| | | | |
|---|---|---|---|
| 4,073,021 A | 2/1978 | Carlisle | |
| 4,389,742 A | 6/1983 | DeWitt | |
| 4,422,194 A | 12/1983 | Viesturs et al. | |
| 4,483,030 A * | 11/1984 | Flick | A61G 7/05769 |
| | | | 156/274.6 |
| 4,541,136 A | 9/1985 | Graebe | |
| 4,707,872 A | 11/1987 | Hessel | |
| 4,930,171 A | 6/1990 | Frantz | |
| 5,044,030 A | 9/1991 | Balaton | |
| 5,201,780 A | 4/1993 | Dinsmoor et al. | |
| 5,243,722 A | 9/1993 | Gusakov | |
| 5,513,899 A | 5/1996 | Michaels et al. | |
| 5,638,565 A * | 6/1997 | Pekar | A47C 4/54 |
| | | | 5/653 |
| 5,737,788 A | 4/1998 | Castellino et al. | |
| 5,797,155 A * | 8/1998 | Maier | A61G 5/1043 |
| | | | 297/284.6 |
| 5,836,654 A | 11/1998 | DeBellis et al. | |
| 6,219,867 B1 * | 4/2001 | Yates | A47B 21/0371 |
| | | | 248/118 |
| 6,519,797 B1 * | 2/2003 | Brubaker | A61G 5/1043 |
| | | | 36/29 |
| 6,687,933 B2 | 2/2004 | Habboub et al. | |
| 7,076,822 B2 | 7/2006 | Pearce | |
| 7,191,480 B2 * | 3/2007 | Romano | A47C 27/122 |
| | | | 297/180.14 |
| 7,946,654 B2 | 5/2011 | Tsuber et al. | |
| 8,590,079 B2 | 11/2013 | Habegger | |
| 8,813,284 B2 * | 8/2014 | Teasdale | A61G 7/05776 |
| | | | 5/709 |
| 8,932,692 B2 | 1/2015 | Pearce | |
| 9,107,512 B2 * | 8/2015 | Chen | A47C 27/085 |
| 9,320,666 B2 * | 4/2016 | Bhat | A61G 7/05776 |
| 9,456,943 B2 | 10/2016 | Bhat et al. | |
| 9,789,018 B2 | 10/2017 | Anderson et al. | |
| 9,808,194 B2 | 11/2017 | Bhat et al. | |
| 10,064,772 B2 * | 9/2018 | Bhat | A47C 27/15 |
| 10,286,626 B2 * | 5/2019 | Parsons | F16F 7/121 |
| 2002/0189016 A1 * | 12/2002 | Habboub | A61G 5/1045 |
| | | | 5/654 |
| 2003/0061663 A1 | 4/2003 | Lampel | |
| 2009/0295203 A1 | 12/2009 | Lewis et al. | |
| 2010/0227091 A1 | 9/2010 | Pearce | |
| 2011/0083275 A1 | 4/2011 | Glass | |
| 2011/0239372 A1 | 10/2011 | Bhat et al. | |
| 2012/0090095 A1 | 4/2012 | Fraser | |
| 2013/0019873 A1 | 1/2013 | Choi et al. | |
| 2013/0019881 A1 | 1/2013 | Bhat et al. | |
| 2013/0092175 A1 | 4/2013 | Bhat et al. | |
| 2013/0112213 A1 | 5/2013 | Bhat et al. | |
| 2013/0133138 A1 | 5/2013 | Sugano et al. | |
| 2013/0174855 A1 | 7/2013 | Choi et al. | |
| 2013/0174856 A1 | 7/2013 | Choi et al. | |
| 2013/0174859 A1 | 7/2013 | Bhat et al. | |
| 2013/0180530 A1 | 7/2013 | Choi et al. | |
| 2013/0180531 A1 | 7/2013 | Choi et al. | |
| 2013/0232697 A1 | 9/2013 | Chen | |
| 2013/0270881 A1 | 10/2013 | Fowler et al. | |
| 2013/0298918 A1 | 11/2013 | Choi et al. | |
| 2014/0115790 A1 | 5/2014 | Romano et al. | |
| 2014/0141233 A1 | 5/2014 | Crawford et al. | |
| 2014/0325763 A1 | 11/2014 | Mason | |
| 2015/0196776 A1 | 7/2015 | Bhat et al. | |
| 2015/0238378 A1 | 8/2015 | Bhat et al. | |
| 2016/0128623 A1 | 5/2016 | Bhat | |
| 2016/0151216 A1 | 6/2016 | Bhat et al. | |

FOREIGN PATENT DOCUMENTS

| | | |
|---|---|---|
| DE | 20 2004 016 231 | 2/2005 |
| JP | S60-143938 | 7/1985 |
| JP | 07-132130 | 5/1995 |
| JP | H09-94132 | 8/1997 |
| JP | 2002-119385 | 4/2002 |
| JP | 2002-159374 | 6/2002 |
| JP | 2007-330527 | 12/2007 |
| WO | WO 1997/019619 | 6/1997 |
| WO | WO 2008/036320 | 3/2008 |
| WO | WO 2013/182348 | 12/2013 |

\* cited by examiner

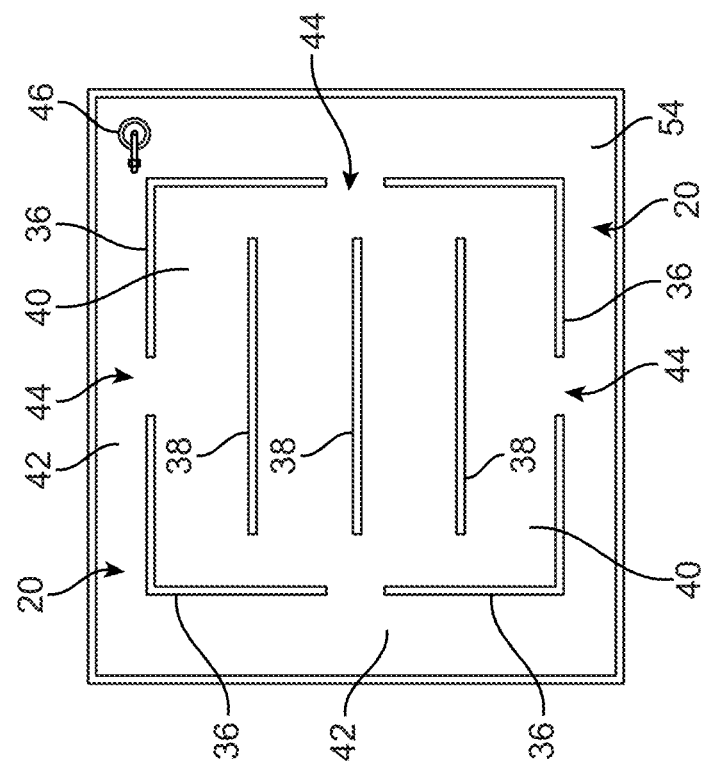
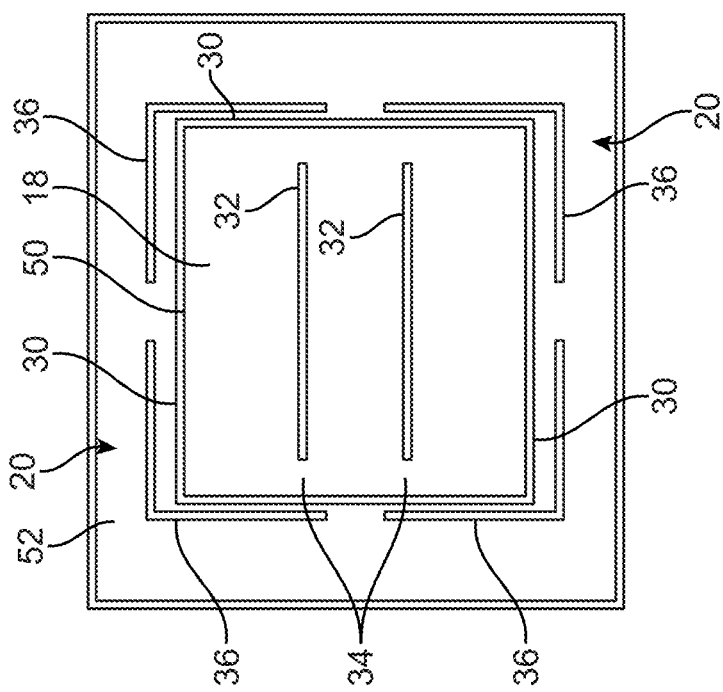
FIG. 4A
FIG. 4B

| Test | Mapping Reference |
|---|---|
| 1 (No cushon) | 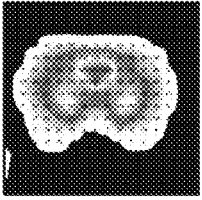 |
| 2 (Multi-layerd support with 1.5 in. x 17 in. x 19 in. foam layer along bottom surface) | 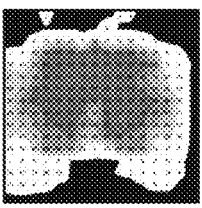 |
| 3 (Gel layer with foam layers along top and bottom surfaces) | 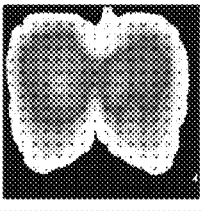 |
| 4 (Multi-layered support with 0.5 in. x 17 in. x 19 in. foam layer along bottom surface) | 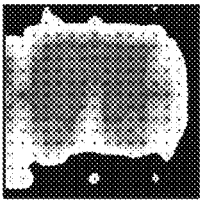 |
| 5 (Multi-layered support with 0.5 in. x 17 in. x 19 in. foam layer along top surface) | 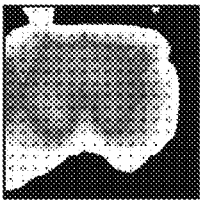 |
| 6 (Multi-layered support with 0.5 in. x 17 in. x 19 in. foam along top and bottom surfaces) | 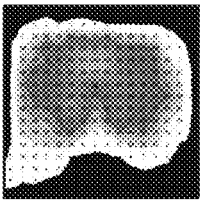 |

FIG. 5

MULTI-LAYERED CUSHIONING SUPPORT

CROSS-REFERENCE TO RELATED APPLICATIONS

This application is a continuation of U.S. patent application Ser. No. 15/016,045 filed on Feb. 2, 2016, which is a continuation of U.S. patent application Ser. No. 14/191,212 filed on Feb. 26, 2014 (now U.S. Pat. No. 9,320,666), each of which is incorporated herein by reference in its entirety.

FIELD OF THE INVENTION

The present invention relates to devices and methods for supporting portions of a patient's body such as for preventing and/or treating pressure ulcers. More particularly, the present invention relates to devices and methods for supporting portions of a patient's body such as for preventing and treating pressure ulcers with cushioning supports having multiple layers.

BACKGROUND OF THE INVENTION

Individuals who are forced to sit or lie down for extended periods of time typically experience tissue necrosis over localized regions of their body known as decubitus ulcers or pressure sores. Pressure ulcers generally occur at locations of the body where the bony prominence is high and the underlying skin breaks down when constant pressure is placed against the skin. Blood circulation is inhibited or prevented in these localized areas and can even occur when the patient has been lying against or upon cushioning devices. Examples of areas of the body where pressure sores typically occur include the sacrum, greater trochanter, ischial tuberosity, malleolus, heel, etc. When pressure ulcers form, they can lead to extensive stays in the hospital or even to amputation.

Conventional cushioning devices generally utilize flexible materials such as foam or springs which allow for the cushion to deform and conform to the patient's body. While the cushioning device attempts to redistribute the loading from localized regions of the patient's body to a larger area over the rest of the body, such devices typically bottom out such that the patient's body contacts the underlying platform and nonetheless localizes the pressure onto the body.

Other cushioning devices have utilized fluid-filled cushions which consist of large single bladders or compartmentalized fluid or gas-filled bladders which inhibit fluid contained within the bladders from flowing laterally. In a fluid filled bladder disposed on a contoured seat, the fluid filled bladder typically bottoms out in one or more areas when supporting a patient's body weight. The places where the bladder bottoms out are sources of high localized pressure. Thus, such an assembly does not distribute pressure evenly across the portions of the anatomy in contact with the bladder. The amount of water that is used in such a bladder can be increased such that bottoming out does not occur. However, this design sacrifices stability. Additionally, since such cushions are typically designed to accommodate a wide range of patient populations, patients who are not as heavy as the maximum for which the cushion was designed for will suffer even more lack of stability than would be needed.

Another problem with simply increasing the amount of fluid to prevent bottoming out is that this requires significant volume of fluid beneath the patient and/or require specialized bedding. Additionally, many fluid filled membranes are too thick to provide adequate pressure relief because the hammocking that occurs in the regions of high protrusions. Thus, the suspension of the patient's body typically results in significantly non-uniform pressure application, with higher pressures being applied to protruding portions of the patient's body due to lack of adequate conformance of the bladder material to the patient's body.

Accordingly, there exists a need for a cushioning device which may conform to regions of the patient's body to prevent decubitis ulcers in a manner which is more cost efficient, convenient, and effective.

BRIEF SUMMARY OF THE INVENTION

A conformable support assembly may be configured to conform to particular regions of a patient's body where pressure ulcers tend to form, e.g., sacrum, trochanter, ischium, head, elbow, heel, as well as any other region of the body where support is desired. Such support is particularly desired when the patient sits, lies, or stands for an extended period of time such as sitting in a wheelchair.

In one variation, the multi-layer cushion support may generally comprise a first support having a first contact surface for contacting a portion of a body and a second surface opposite to the first surface, the first support defining a central chamber and a peripheral chamber surrounding the central chamber, wherein the first support is filled with a first gas or liquid and a second support attached to the first support along the first contact surface, wherein the second support is filled with a second gas or liquid which is relatively more viscous than the first gas or liquid. In particular, the first support may be filled with a volume of air and the second support may be filled with oil which is less than the volume of air.

Generally in use, the multi-layer cushion support may be used to support a portion of a patient's body by providing a multi-layer cushion support comprising a first support having a first contact surface and a second surface opposite to the first surface where the first support defines a central chamber and a peripheral chamber surrounding the central chamber, and a second support attached to the first support along the first contact surface, wherein the first support is filled with a first gas or liquid and the second support is filled with a second gas or liquid which is relatively more viscous than the first gas or liquid and positioning the second support adjacent to the portion of the body.

Various features which may be incorporated or included into the support assemblies described herein may be seen in further detail in the following U.S. patent application Ser. No. 13/189,320 filed Jul. 22, 2011 (U.S. Pub. 2013/0019873); Ser. No. 13/407,628 filed Feb. 28, 2012 (U.S. Pub. 2013/0019881); Ser. No. 13/683,198 filed Nov. 21, 2012 (U.S. Pub. 2013/0112213); Ser. No. 13/693,691 filed Dec. 4, 2012 (U.S. Pub. 2013/0092175); Ser. No. 13/760,482 filed Feb. 6, 2013 (U.S. Pub. 2013/0180530); Ser. No. 13/784,035 filed Mar. 4, 2013 (U.S. Pub. 2013/0180531); Ser. No. 13/784,133 filed Mar. 4, 2013 (U.S. Pub. 2013/0174855); Ser. No. 13/784,215 filed Mar. 4, 2013 (U.S. Pub. 2013/0174856); Ser. No. 13/784,260 filed Mar. 4, 2013 (U.S. Pub. 2013/0174859); Ser. No. 13/945,684 filed Jul. 18, 2013 (U.S. Pub. 2013/0298918); Ser. No. 13/065,877 filed Mar. 30, 2011 (U.S. Pub. 2011/0239372); and Ser. No. 13/973,840 filed Aug. 22, 2013. Each of which is incorporated herein by reference in its entirety and for any purpose herein.

A cushion support may have a multi-layered cushioning support contained within an enveloping cover. The multi-layered cushioning support may generally comprise several interconnected chambers configured to have a central support region and a surrounding support region which are in fluid communication with one another. The multi-layered support may be optionally filled with a gas (such as air) or liquid (such as water or mineral oil) or a combination of both. The multi-layered support may also be sized in various dimensions suitable for placement under a patient body, e.g., 18 in.×20 in. for use as a cushion such as on a wheelchair. The multi-layered support may also incorporate a relatively smaller secondary chamber formed by an additional layer attached (such as by welding) upon the surface of the central support region such that the region surrounds this secondary chamber. The secondary chamber may be filled by a volume of liquid, such as mineral oil, which is relatively more viscous than the gas or liquid filled within the central support region or surrounding support region. Moreover, this secondary chamber may remain fluidly disconnected from the central support region and the surrounding support region.

A cushioning foam layer may be positioned adjacent to the support provided that this cushioning foam layer is positioned along a bottom surface of the support, i.e., along a surface of the support opposite from the secondary chamber. This is to allow for the multi-layered support and secondary chamber to come into direct contact against the patient's body without any other materials interfering (aside from the cover). The cushioning foam layer may be comprised of, e.g., different density polyurethane foams, which can be fabricated into different sizes and thicknesses (e.g., 17 in.×19 in.×0.5 in.) depending upon the desired application. The foam layer can be alternatively replaced by other cushioning designs such as a gel-type material, biasing springs, etc.

The cover may envelope both the multi-layer support and the foam layer and may also be fabricated from various materials which can be breathable and waterproof. The surface of the cover may also be made to have, e.g., an anti-skid surface, over its entire surface or along selective surfaces such as the bottom surface in contact with a platform. The cover may be sized (e.g., 18 in.×20 in.×1.5 in.) similarly to the multi-layer support and foam layer which may both be inserted into the cover through an opening defined along one of the edges of the cover. Additionally, while the individual layers may be maintained in their relative positioning by various mechanisms such as straps, fasteners, adhesives, etc., their relative positioning may also be maintained by the cover. Also, while the cover may be placed atop the secondary chamber for direct contact against the patient's body, the cover is sufficiently thin enough so as not to interfere with the cushioning support provided the layers.

The cushioning foam layer is positioned along a bottom surface of the support, i.e., along a surface of the support opposite from the secondary chamber, so that the secondary chamber and multi-layer support may be positioned into direct contact through the cover, if present, against the patient's body. Having the secondary chamber of the support placed into contact against the patient's body allows for effective pressure distribution throughout the support while the foam positioned beneath the support (i.e., along the surface of the support opposite of the secondary chamber and away from the patient's body) provides for further cushioning support of the patient's body.

However, other variations of the cushioning support may include one example where the foam layer may be positioned atop the multi-layer support. In this variation, the foam layer may be positioned along the same surface of the secondary chamber such that the foam layer comes into contact through the cover with the patient's body.

Turning now to the multi-layer support, the secondary chamber may be formed atop the support via attachment along its edges which may be welded, adhered, or otherwise attached. While the secondary chamber may form a single chamber, one or more barriers or boundaries may be formed along the secondary chamber at least partially dividing the secondary chamber into one or more sub-chambers which are fluidly connected to one another. The inclusion of the barriers or boundaries may effectively slow or inhibit the flow of any fluids contained within the secondary chamber from shifting to quickly such as when the patient adjusts their body position upon the support.

Moreover, the secondary chamber may be formed to have an overall volume of, e.g., 0.6 liters, although this volume may be decreased or increased depending upon the desired results and the type of liquid contained within the chamber. This variation may contain, e.g., 0.6 liters of mineral oil, as the oil may help in reducing the pressure in combination with an underlying air layer contained within the remaining chamber of the support. When in use, the oil layer within the chamber may be cradled by the underlying air chamber to prevent any potential "edge effects" associated with fluid interfaces. Moreover, the inclusion of the oil layer within the chamber may also facilitate the delivery of cooling or heating therapy against the patient body as oil may be cooled or heated by any number of passive or active methods.

Variations of the multi-layered support described herein may be used for supporting other regions of the body. For instance, an embodiment for supportive use of the patient's heels may similarly utilize the same features. Such a variation may be designed to have dimensions scaled appropriately for supporting a heel (e.g., 10 to 13 in. width, 28 to 35 in. length, and 2 to 8 in. height) such that the support may be positioned below the calf when the patient is lying upon a bed so that the heel is lifted off the surface of the bed. The heel protector can also be designed to have an incline to give a gentle slope.

BRIEF DESCRIPTION OF THE DRAWINGS

FIGS. 4A and 4B show top and bottom views, respectively, of the multi-layered support.

FIG. 5 shows a chart illustrating experimental results comparing pressure measurements with variations of the multi-layered support.

DETAILED DESCRIPTION OF THE INVENTION

Generally, in a healthy individual, the presence of muscle mass and soft tissue usually functions to distribute and relieve pressure from bony protuberances of the body contacted against the underlying surface. However, when a patient is forced to lie on one portion of their body for extended periods of time, areas such as the sacrum or trochanter (or other portions of the body such as the heel, elbow, head, etc.) may compress a region of the skin and tissue between the protuberance and a contact region formed against the underlying surface.

A support assembly may be worn or used to support an individual who may be immobilized, e.g., such as sitting in a wheelchair, for extended periods of time to prevent the formation of pressure ulcers. Such a support assembly may be placed against and/or beneath particular regions of the body where pressure ulcers tend to form, e.g., sacrum, trochanter, ischium, head, elbow, heel, as well as any other region of the body where support is desired. Various features which may be incorporated or included into the support assemblies described herein may be seen in further detail in the following U.S. patent application Ser. No. 13/189,320 filed Jul. 22, 2011 (U.S. Pub. 2013/0019873); Ser. No. 13/407,628 filed Feb. 28, 2012 (U.S. Pub. 2013/0019881); Ser. No. 13/683,198 filed Nov. 21, 2012 (U.S. Pub. 2013/0112213); Ser. No. 13/693,691 filed Dec. 4, 2012 (U.S. Pub. 2013/0092175); Ser. No. 13/760,482 filed Feb. 6, 2013 (U.S. Pub. 2013/0180530); Ser. No. 13/784,035 filed Mar. 4, 2013 (U.S. Pub. 2013/0180531); Ser. No. 13/784,133 filed Mar. 4, 2013 (U.S. Pub. 2013/0174855); Ser. No. 13/784,215 filed Mar. 4, 2013 (U.S. Pub. 2013/0174856); Ser. No. 13/784,260 filed Mar. 4, 2013 (U.S. Pub. 2013/0174859); Ser. No. 13/945,684 filed Jul. 18, 2013 (U.S. Pub. 2013/0298918); Ser. No. 13/065,877 filed Mar. 30, 2011 (U.S. Pub. 2011/0239372); and Ser. No. 13/973,840 filed Aug. 22, 2013. Each of which is incorporated herein by reference in its entirety and for any purpose herein.

Figure 1A:
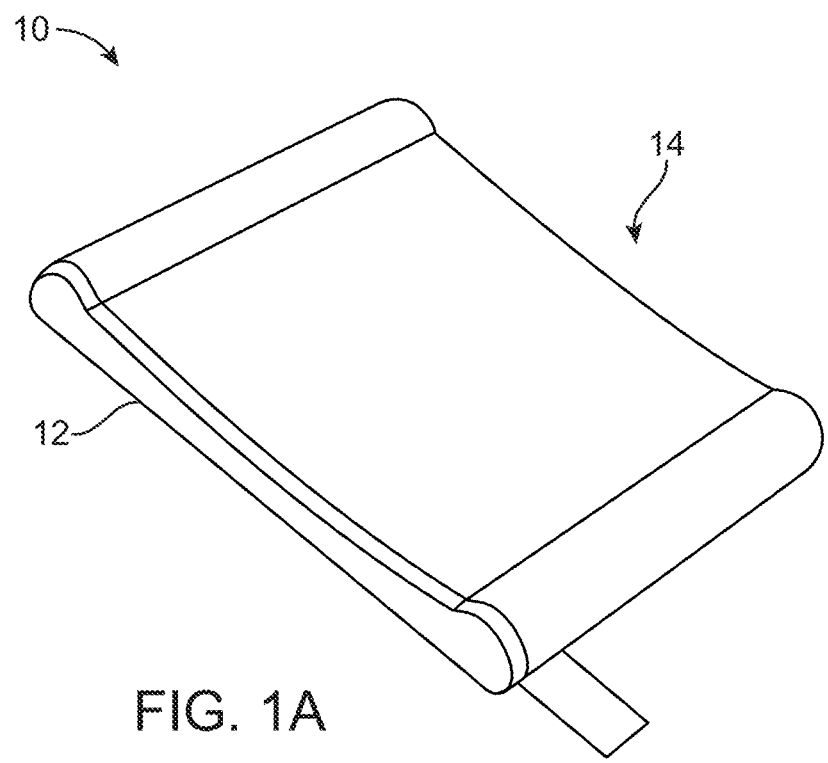
FIG. 1A shows a perspective view of a cushioning support assembly having a foam layer and a multi-layered support enclosed within a covering.
Figure 1B:
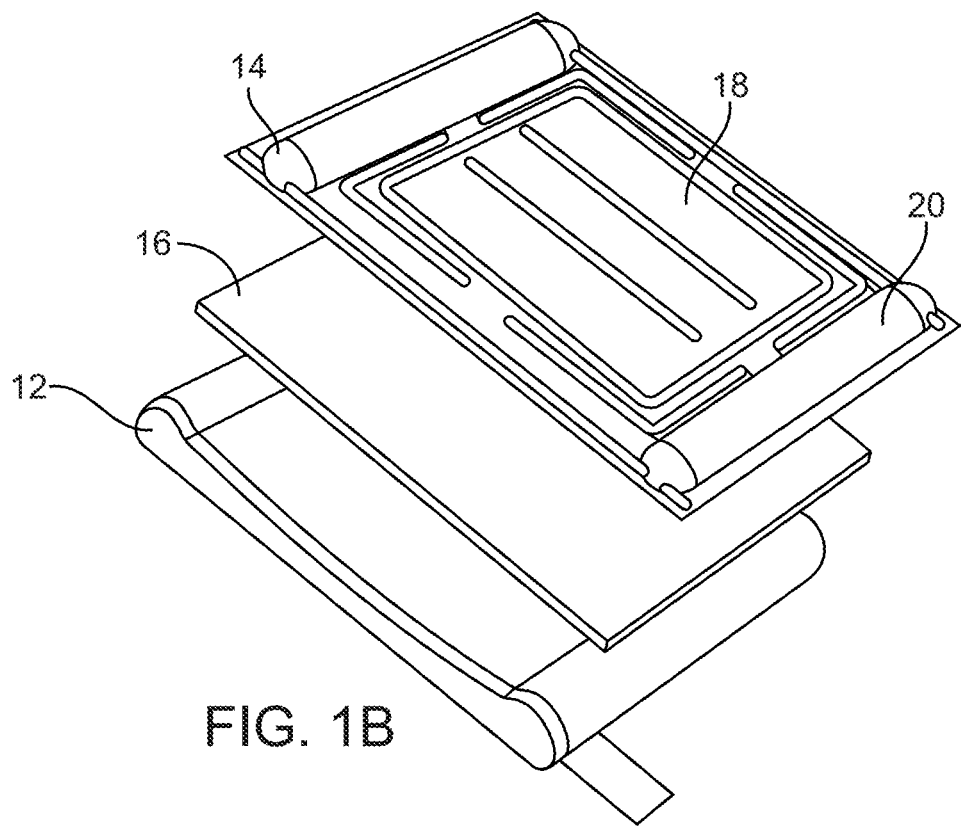
FIG. 1B shows an exploded assembly view of the individual foam layer and multi-layered support where the foam layer is positioned along the bottom surface of the multi-layered support or along the surface of the multi-layered support opposite to the contact surface.

One example of a supporting cushion is shown in the perspective view of FIG. 1A, which illustrates a cushion support 10 having a multi-layered cushioning support 14 contained within an enveloping cover 12. FIG. 1B shows an exploded assembly view of the multi-layered cushioning support 14 (described in further detail below) which may generally comprise several interconnected chambers configured to have a central support region and a surrounding support region 20 which are in fluid communication with one another. The multi-layered support 14 may be optionally filled with a gas (such as air) or liquid (such as water or mineral oil) or a combination of both. The multi-layered support 14 may also be sized in various dimensions suitable for placement under a patient body, e.g., 18 in.×20 in. for use as a cushion such as on a wheelchair. The multi-layered support 14 may also incorporate a relatively smaller secondary chamber 18 formed by an additional layer attached (such as by welding) upon the surface of the central support region 20 such that the region 20 surrounds this secondary chamber 18. The secondary chamber 18 may be filled by a volume of liquid, such as mineral oil, which is relatively more viscous than the gas or liquid filled within the central support region or surrounding support region 20. Moreover, this secondary chamber 18 may remain fluidly disconnected from the central support region and the surrounding support region 20.

Aside from the multi-layered support 14, an additional cushioning foam layer 16 may be positioned adjacent to the support 14 provided that this cushioning foam layer 16 is positioned along a bottom surface of the support 14, i.e., along a surface of the support 14 opposite from the secondary chamber 18. This is to allow for the multi-layered support 14 and secondary chamber 18 to come into direct contact against the patient's body without any other materials interfering (aside from the cover 12). The cushioning foam layer 16 may be comprised of, e.g., different density polyurethane foams, which can be fabricated into different sizes and thicknesses (e.g., 17 in.×19 in.×0.5 in.) depending upon the desired application. The foam layer 16 can be alternatively replaced by other cushioning designs such as a gel-type material, biasing springs, etc.

The cover 12 may envelope both the multi-layer support 14 and the foam layer 16 and may also be fabricated from various materials which can be breathable and waterproof. The surface of the cover 12 may also be made to have, e.g., an anti-skid surface, over its entire surface or along selective surfaces such as the bottom surface in contact with a platform. The cover 12 may be sized (e.g., 18 in.×20 in.×1.5 in.) similarly to the multi-layer support 14 and foam layer 16 which may both be inserted into the cover 12 through an opening defined along one of the edges of the cover 12. Additionally, while the individual layers 14, 16 may be maintained in their relative positioning by various mechanisms such as straps, fasteners, adhesives, etc., their relative positioning may also be maintained by the cover 12. Also, while the cover 12 may be placed atop the secondary chamber 18 for direct contact against the patient's body, the cover 12 is sufficiently thin enough so as not to interfere with the cushioning support provided the layers 14, 16.

As previously discussed, the cushioning foam layer 16 is positioned along a bottom surface of the support 14, i.e., along a surface of the support 14 opposite from the secondary chamber 18, as shown in FIG. 1B, so that the secondary chamber 18 and multi-layer support 14 may be positioned into direct contact through the cover 12, if present, against the patient's body. Having the secondary chamber 18 of the support 14 placed into contact against the patient's body allows for effective pressure distribution throughout the support 14 while the foam 16 positioned beneath the support 14 (i.e., along the surface of the support 14 opposite of the secondary chamber 18 and away from the patient's body) provides for further cushioning support of the patient's body.

Figure 2A:
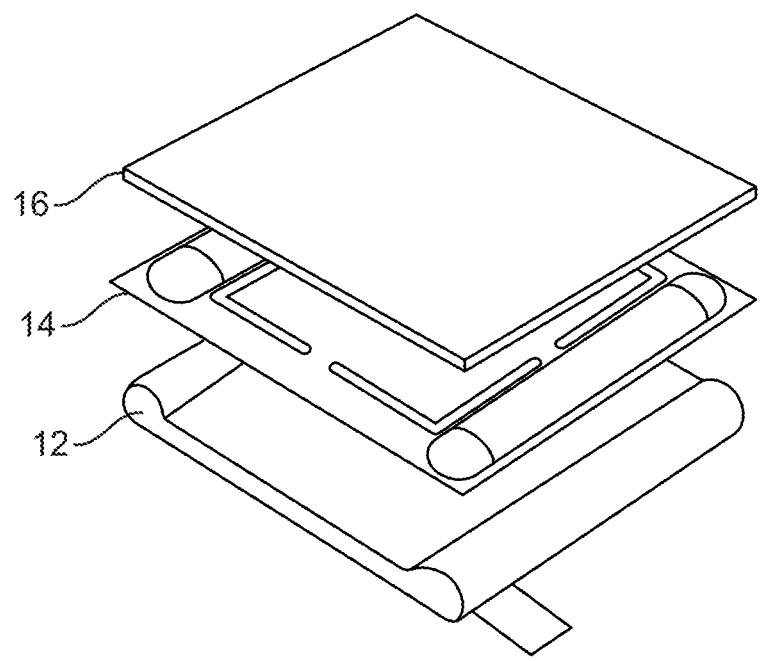
FIG. 2A shows an exploded assembly view of another variation where the foam layer is positioned upon the top surface or contact surface of the multi-layered support.
Figure 2B:
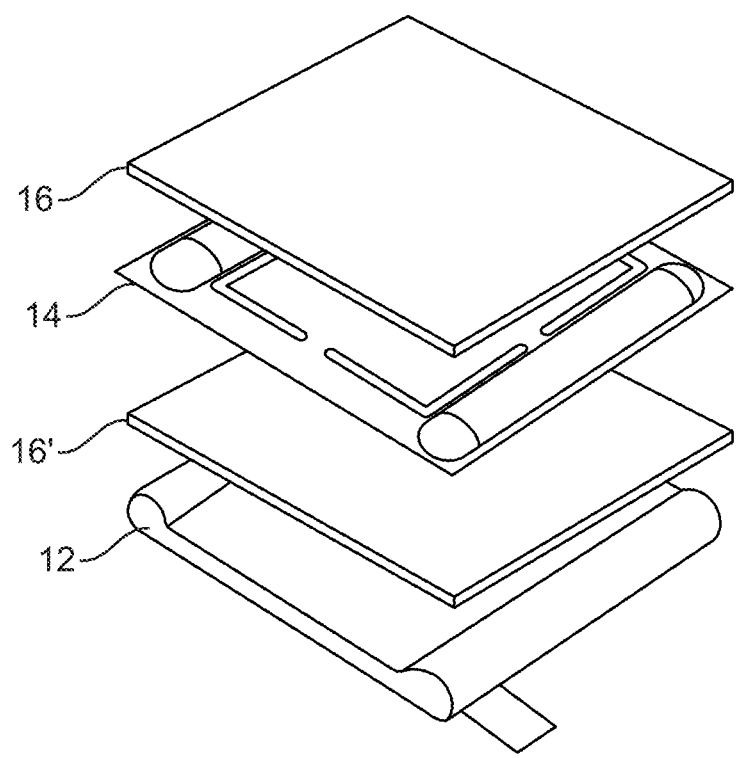
FIG. 2B shows an exploded assembly view of yet another variation where a first foam layer is positioned upon the top surface or contact surface as well as the bottom surface of the multi-layered support.

However, other variations of the cushioning support may include one example where the foam layer 16 may be positioned atop the multi-layer support 14, as shown in the exploded assembly view of FIG. 2A. In this variation, the foam layer 16 may be positioned along the same surface of the secondary chamber 18 such that the foam layer 16 comes into contact through the cover 12 with the patient's body. Another variation is shown in the exploded assembly view of FIG. 2B which is similar to the variation of FIG. 2A but with the addition of a second foam layer 16' positioned beneath the multi-layer support 14. In this case, the foam layer 16 and second foam layer 16' may be fabricated from the same or different materials and may be configured into the same or different dimensions depending upon the desired results.

Figure 3A:
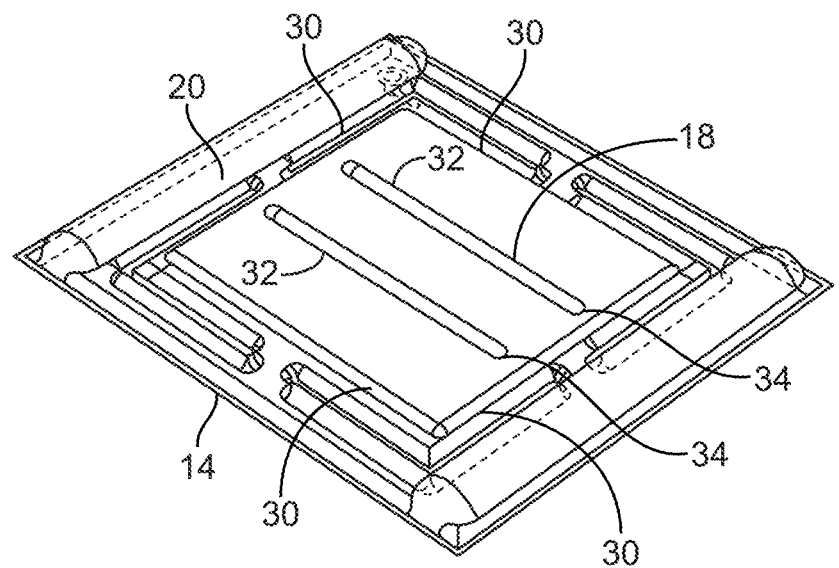
FIG. 3A shows a perspective view of the multi-layered support.
Figure 3B:
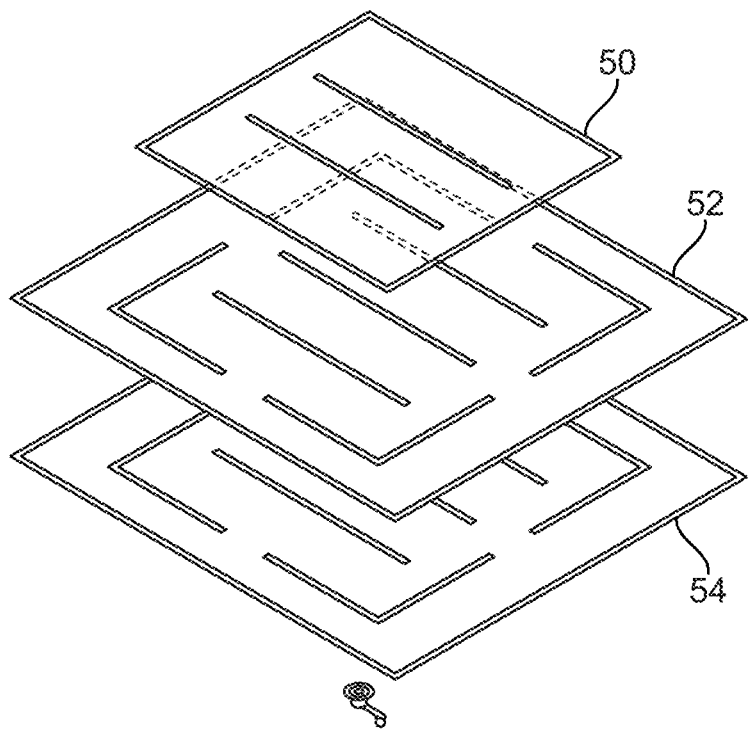
FIG. 3B shows an exploded assembly view of the individual layers forming the multi-layered support.

Turning now to the multi-layer support 14, a perspective view of one variation of the support is shown in FIG. 3A and an exploded assembly view of the individual layers forming the multi-layered support 14 is shown FIG. 3B. The secondary chamber 18 may be formed atop the support 14 via attachment along its edges 30 which may be welded, adhered, or otherwise attached. While the secondary chamber 18 may form a single chamber, one or more barriers or boundaries 32 may be formed along the secondary chamber 18 at least partially dividing the secondary chamber 18 into one or more sub-chambers which are fluidly connected to one another. The inclusion of the barriers or boundaries 32 may effectively slow or inhibit the flow of any fluids contained within the secondary chamber 18 from shifting to quickly such as when the patient adjusts their body position upon the support 14. The example shown in FIG. 3A illustrates a variation where the two barriers or boundaries 32 are formed in parallel along the secondary chamber 18 although in other variations, fewer than or more than two barriers or boundaries 32 may be formed in parallel configurations or various other configurations.

Moreover, the secondary chamber 18 may be formed to have an overall volume of, e.g., 0.6 liters, although this volume may be decreased or increased depending upon the desired results and the type of liquid contained within the chamber 18. This volume held within the secondary chamber 18 is less than the volume in the underlying support 14. This variation may contain, e.g., 0.6 liters of mineral oil, as the oil may help in reducing the pressure in combination with an underlying air layer contained within the remaining chamber of the support 14. When in use, the oil layer within the chamber 18 may be cradled by the underlying air chamber to prevent any potential "edge effects" associated with fluid interfaces. Moreover, the inclusion of the oil layer within the chamber 18 may also facilitate the delivery of cooling or heating therapy against the patient body as oil may be cooled or heated by any number of passive or active methods. Additionally and/or alternatively, the air within the remaining chamber may also be cooled or heated by any number of methods as well. However, because oil has a relatively higher specific heat than air, the oil layer within the chamber 18 may retain heat for longer periods of time.

As shown in the exploded assembly view of FIG. 3B, each of the individual layers forming the multi-layered support 14 may be seen. A first layer 50 forming the top layer of the secondary chamber 18 may be formed as a sheet having a thickness (e.g., 0.020 in.) made from various polymeric materials, e.g., polyvinyl chloride (PVC). The first layer 50 may be formed to have various dimensions (e.g., 13 in.×12 in.) which are shorter than the second layer 52 upon which the first layer 50 may be attached. The second layer 50 and third layer 54 may also be formed as sheets having a thickness (e.g., 0.010 in.) similarly made from various polymeric materials such as PVC. Each of the layers 52, 54 may be similarly sized to have various dimensions (e.g., 20 in.×18 in.) and may be attached to one another along seams formed around the periphery of the layers 52, 54 as well as along various locations between the sheets. However, while the second and third layers 52, 54 are attached to one another, the first layer 50 may remain attached only to the underlying second layer 52.

The top and bottom views of the multi-layer support 14 are shown in further detail in respective FIGS. 4A and 4B. As illustrated in FIG. 4A, while the first layer 50 may be welded or otherwise attached to the second layer 52 around the periphery of the first layer 50 along attachment 30, the formation of the barriers or boundaries 32 may also be seen formed between the first layer 50 and second layer 52. As previously described, the barriers or boundaries 32 may be formed at least partially between the respective layers 50, 52 such that fluid passageways 34 are formed between each of the sub-chambers to allow for the passage of fluid throughout the secondary chamber 18. The fluid passageways 34 may be formed to have a width of, e.g., 1.5 in. or more.

As illustrated in the bottom view of FIG. 4B, further details may be seen between the second layer 52 and third layer 54. The second and third layers 52, 54 may be attached or otherwise welded to one another to divide the support into sub-chambers which remain in fluid communication with one another. In this variation, a central chamber 40 may be defined along a central portion of the support 14 while a peripheral chamber 42 may be formed to surround the central chamber 40. One or more barriers or boundaries 36 may be formed between the central chamber 40 and the surrounding chamber 42 by welding or otherwise attaching portions of the second and third layers 52, 54 to one another. The barrier or boundary 36 may be formed to follow the outer periphery of the support 14 (e.g., having a width ranging from 2 in. to 3 in.) while also defining one or more fluid passageways 44 (e.g., having a width of 2 in. or more) between the central chamber 40 and the surrounding chamber 42. The fluid passageways 44 may be formed along each of the sides of the barrier or boundary 36 to allow for the passage of air between the central chamber 40 and surrounding chamber 42.

With the multiple layers of support as well as the use of multiple sub-chambers, the gas or liquid within the support 14 may become displaced (within each of the layers) when a portion of the patient's body is positioned thereupon. At least some of the air in the central chamber 40 may displace through one or more of the fluid passageways 44 into the peripheral chamber 42 to one or more regions adjacent to the portion of the body and cause the sides of the support 14 (e.g., the surrounding peripheral chamber 42 and any portions of the central chamber 40 adjacent to the body portion) to lift up slightly relative to the portion of the support 14 which is in contact with the body portion. Some of the oil or liquid within the secondary chamber 18 may also displace away from the body portion through fluid passageways 34 but remains within the secondary chamber 18.

As the peripheral chamber 42 lifts relative to the portion of the support 14 which is in contact with the body portion, the displaced liquid or gas may also increase the surface area of the support 14 contacting against and supporting the portion of the body resulting in a cradling effect on the body portion. For example, if the patient's hip were placed upon the support 14, the displaced air within the central chamber 40 (and/or the oil in the secondary chamber 18) may become displaced immediately below the contacted hip. The displaced liquid or gas from the central chamber 40 may flow into the adjacent peripheral chamber 42 which may rise slightly relative to the central chamber 40 such that the hip becomes cradled by the support 14. Additionally, the overall surface area of the support 14 contacting against the hip may increase and the support 14 may lift up not only the hip but the regions of the patient's body adjacent to the hip.

The central chamber 40 may also have one or more barriers or boundaries 38 defined along the central chamber 40 as well. Although three boundaries 38 are shown in parallel with one another, fewer than or greater than three boundaries 38 may be formed. Each of the barriers or boundaries 36, 38 as well as the passageways 44 may allow for fluid communication throughout the central chamber 40 and surrounding chamber 42 in a controlled manner. Additionally, the third layer 54 may also incorporate a valve 46 to allow for the passage of air into the support 14. The volume of the secondary chamber 18 may remain fluidly disconnected from the remainder of the support 14 since the secondary chamber 18 may be filled with a volume of mineral oil, e.g., 0.6 liters.

Experimental Results

In determining the efficiency of the embodiments described herein, several experiments were conducted to measure the skin interface peak pressure values (mmHg) from a patient (24 year old male, 155 lbs) sitting upon various cushioning supports placed within a conventional wheelchair. The resulting pressures generated by the patient were then measured and compared as shown in the following Table 1:

TABLE 1

Measured pressure values.

| Test | Peak Pressure (mmHg) | | | | % Increase in Avg. Peak Pressure Relative to Multi-Layered Support Having 1.5 × 17 × 19 Thick Foam on Bottom |
|---|---|---|---|---|---|
| | #1 | #2 | #3 | Average | |
| 1 (No cushon) | 200 | | | 200 | 59% |
| 2 (Multi-layered support with 1.5 in. × 17 in. × 19 in. foam layer along bottom surface) | 84.84 | 81.79 | 78.64 | 81.8 | 0% |
| 3 (Gel layer with foam layers along top and bottom surfaces) | 128.3 | 102.75 | 108.29 | 113.1 | 28% |
| 4 (Multi-layered support with 0.5 in. × 17 in. × 19 in. foam layer along bottom surface) | 81.51 | 91.37 | 84.94 | 85.9 | 5% |
| 5 (Multi-layered support with 0.5 in. × 17 in. × 19 in. foam layer along top surface) | 105.11 | 107.29 | 101.39 | 104.6 | 22% |
| 6 (Multi-layered support with 0.5 in. × 17 in. × 19 in. foam along top and bottom surfaces) | 102.51 | 106.81 | 101.5 | 103.6 | 21% |

FIG. 5 shows the corresponding pressure maps generated by the patient body along each of the tested embodiments shown above in Table 1.

As shown in the Table above, tests were performed with several different support configurations and multiple readings were compiled and averaged for each support configuration. The embodiment of the multi-layered support 14 having the foam layer 16 (having a thickness of 1.5 in.) positioned beneath the support 14 is shown in Test 2 which indicates a 0% for a baseline pressure measurement. The peak pressure of 200 mmHg with no cushioning support at all was measured in Test 1 correlating to a 59% increase in the average peak pressure measured relative to the embodiment of Test 2. The higher the percentage increase in measured peak pressure indicates a corresponding drop in the cushioning support provided.

Test 3 was performed utilizing a conventional Coccyx Gel/Foam Cushion (Nova Ortho-Med, Inc.) typically used in wheelchairs for comparison. The average measured peak pressure correlated to a relative 28% increase which corresponds to a drop in cushioning support relative to the embodiment of Test 2. These results indicate that the cushioning support provided by the embodiment described for Test 2 provides for a significant pressure drop and increase in cushioning support compared to no support at all and also compared to a conventional cushioning support.

The remaining tests were performed with a multi-layered support 14 having a foam layer 16 which was relatively thinner (having a thickness of 0.5 in. compared to a thickness of 1.5 in.) positioned relative to the support 14. Test 4 was performed using the relatively thinner foam layer 16 positioned similarly along a bottom surface of the support 14 correlating to a relative 5% increase in average peak pressure which corresponds to a drop in cushioning support relative to the embodiment of Test 2.

Test 5 was performed using the relatively thinner foam layer 16 positioned along a top surface of the support 14 which correlated to a relative 22% increase in average peak pressure which also corresponds to a drop in cushioning support relative to the embodiment of Test 2. Test 6 was performed using the relatively thinner foam layer 16 positioned along both a top and bottom surface of the support 14 which correlated to a relative 21% increase in average peak pressure which also corresponds to a drop in cushioning support relative to the embodiment of Test 2. These test results in particular indicate the desirability of positioning the foam layer 16 along the bottom surface of the support 14 away from the patient body so as not to dampen the supportive effects of the secondary chamber 18 and the overall support 14. Additionally, an increase in the thickness of the foam layer 16 also provides for an increase in cushioning support.

Variations of the multi-layered support described herein may be used for supporting other regions of the body. For instance, an embodiment for supportive use of the patient's heels may similarly utilize the same features. Such a variation may be designed to have dimensions scaled appropriately for supporting a heel (e.g., 10 to 13 in. width, 28 to 35 in. length, and 2 to 8 in. height) such that the support may be positioned below the calf when the patient is lying upon a bed so that the heel is lifted off the surface of the bed. The heel protector can also be designed to have an incline to give a gentle slope.

The applications of the devices and methods discussed above are not limited to particular regions of the body such as the sacrum, trochanter, ischium, head, elbow, heel, etc. but may include any number of further applications. Modification of the above-described device and methods for carrying out the invention, and variations of aspects of the invention that are obvious to those of skill in the art are intended to be within the scope of the claims.

What is claimed is:

1. A multi-layer cushion support, comprising:
a first layer and a second layer opposite to and attached to the first layer, defining a central chamber having edges and at least one peripheral chamber adjacent to at least a portion of the edges of the central chamber, wherein the central chamber and the at least one peripheral chamber are filled with a first gas or liquid;
first guides formed between the first and second layer, wherein the first guides start from a first non-edge position between the first and second layer and end at a second non-edge position between the respective first or second layer;
a third layer, smaller than the second layer and attached to the second layer, defining a secondary chamber, wherein the secondary chamber is filled with a second gas or liquid which is more viscous than the first gas or liquid; and
second guides formed between the second and third layer, wherein the second guides start from a first non-edge position on the third layer and end at a second non-edge position on the third layer, and wherein the second guides are located within a periphery formed by the first guides.

2. The multi-layer cushion support of claim 1 wherein the multi-layer cushion support is configured to adjust an overall volume in response to a patient body.

3. The multi-layer cushion support of claim 1 wherein the multi-layer cushion support is configured for positioning upon a platform.

4. The multi-layer cushion support of claim 1 wherein the multi-layer cushion support is configured to provide a cooling or heating therapy.

5. The multi-layer cushion support of claim 1 wherein the first gas or liquid comprises air.

6. The multi-layer cushion support of claim 1 wherein the second gas or liquid comprises oil.

7. The multi-layer cushion support of claim 1 wherein the central chamber and the at least one peripheral chamber are in fluid communication with one another via one or more passageways.

8. The multi-layer cushion support of claim 1 wherein the first guides define one or more passageways between the central chamber and the at least one peripheral chamber.

9. The multi-layer cushion support of claim 1 wherein the first guides define corners having gaps therebetween.

10. The multi-layer cushion support of claim 1 further comprising a foam layer positioned adjacent to the second layer.

11. The multi-layer cushion support of claim 10 further comprising a cover configured to envelop the first layer, the second layer, and the foam layer.

12. A multi-layer cushion support, comprising:
a first layer and a second layer opposite to and attached to the first layer, defining a central chamber having edges and a peripheral chamber surrounding the central chamber, wherein the central chamber and the peripheral chamber are filled with a first gas or liquid;
first guides formed between the first and second layer, wherein the first guides start from a first non-edge position on the first or second layer and end at a second non-edge position on the respective first or second layer;
a third layer, smaller than the second layer and attached to the second layer, defining a secondary chamber, wherein the secondary chamber is filled with a second gas or liquid which is more viscous than the first gas or liquid and wherein the secondary chamber is sized to contain a maximum volume which is less than a maximum combined volume of the central chamber and the peripheral chamber; and
second guides formed on the third layer, wherein the second guides start from a first non-edge position on the third layer and end at a second non-edge position on the third layer, and wherein the second guides are located within a periphery formed by the first guides.

13. The multi-layer cushion support of claim 12 wherein the first guides define corners having gaps therebetween.

14. The multi-layer cushion support of claim 12 wherein the central chamber and the peripheral chamber are in fluid communication with one another via one or more passageways.

15. The multi-layer cushion support of claim 12 further comprising a foam layer positioned adjacent to the second layer.

16. The multi-layer cushion support of claim 12 wherein the second guides are spaced from each other and from peripheral edges of the secondary chamber.

* * * * *